Nov. 3, 1925.   
E. J. WILSON   
1,559,824
MECHANISM FOR MEASURING THE WIDTH OF ENDLESS FELTS
Filed Feb. 25, 1922
*Fig. 1*
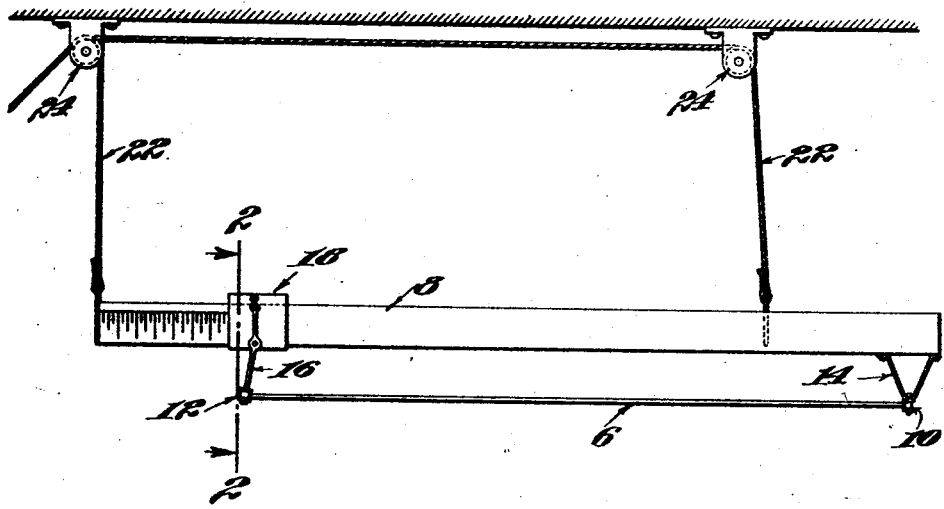
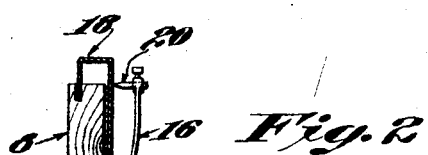
*Fig. 2*
*Fig. 3.*
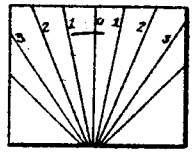
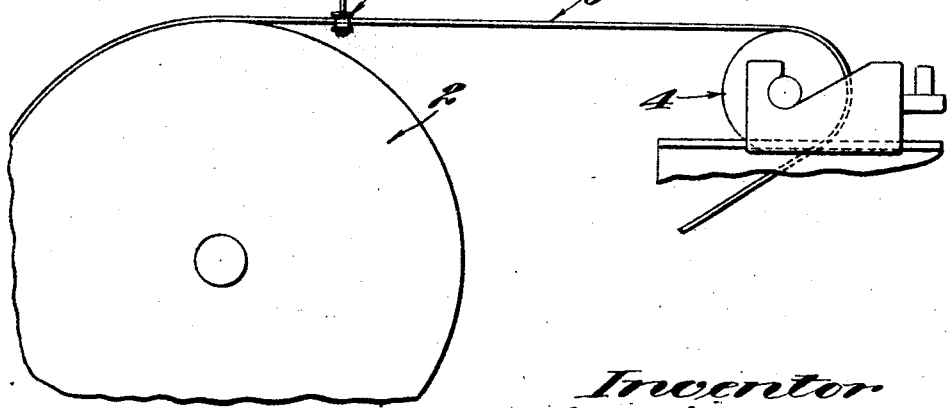
Witness
M. G. Crozier
Inventor
Ezekiel J. Wilson
by Van Everen Fish Hildreth & Cary
Attys Patented Nov. 3, 1925.

1,559,824

UNITED STATES PATENT OFFICE.

EZEKIEL J. WILSON, OF EAST GREENBUSH, NEW YORK, ASSIGNOR TO F. C. HUYCK & SONS, OF RENSSELAER, NEW YORK, A CORPORATION OF NEW YORK.

MECHANISM FOR MEASURING THE WIDTH OF ENDLESS FELTS.

Application filed February 25, 1922. Serial No. 539,184.

*To all whom it may concern:*

Be it known that I, EZEKIEL J. WILSON, a citizen of the United States, residing at East Greenbush, in the county of Rensselaer and State of New York, have invented certain new and useful Improvements in Mechanism for Measuring the Width of Endless Felts; and I do hereby declare the following to be a full, clear, and exact description of the invention, such as will enable others skilled in the art to which it appertains to make and use the same.

The invention relates to mechanism for measuring the width of endless felts such as are used in paper making machines.

Felts of this character after being fulled are stretched to a pre-determined length and dried under a heavy tension and when finished each felt, if properly fabricated and treated, should have a substantially uniform pre-determined width throughout its length. It becomes important, therefore, that any variation from the proper uniform width should be known, and also whether such variation is sufficient to impair the utility or efficiency of the felt when subsequently utilized in the paper making machine for which it is intended. The present invention secures this important result by the provision of means for measuring the width and for indicating variations in the width of the finished felt carried by the drums or rolls of the machine by which it is stretched and dried. The mechanism which measures and indicates variation in the width of the felt may also, and preferably does, record the extent of the variation so that a permanent record of the variation in the width of each felt may be kept for future reference.

A preferred form of the invention applied to a felt drying machine is shown in the accompanying drawings in which Fig. 1 is a front elevation and Fig. 2 a sectional side elevation on line 2, Fig. 1, the measuring and indicating means being shown in these views for the sake of clearness on an enlarged scale as compared with the drying drum and take-up roll and Fig. 3 is a detail showing a chart.

The drying machine indicated in the drawings comprises a heated drying drum or roll 2 which is mounted and driven in the usual manner, and a take-up or stretching roll 4 over which the felt passes and by movement of which the damp or partially dried felt is stretched to its finished length under heavy tension. After the drying has been completed and while the felt is still carried and held under tension by the rolls its width, and any variation in width either below or above that which the felt should have, is measured and recorded.

The measuring and recording means indicated comprises a bar 8 arranged transversely of the travelling felt and provided with two edge engaging members 10 and 12 adapted to ride against the opposite edges of the felt travelling between them. The member 10 is in the form of a roll mounted on a depending arm 14 fixed to one end of the bar. The other member 12 is in the form of a follower roll carried on the lower end of an arm 16 which is mounted on the bar so that it may move toward and from the member 10 to accommodate itself to variations in the width of the felt passing between the members 10 and 12. To adapt the mechanism for measuring felts of different widths the arm 16 is carried on an adjustable frame 18 mounted to slide lengthwise of the bar. The end of the bar is graduated to indicate the normal width of the felt corresponding to an adjustment of the frame 18 which properly positions the arm 16 to cause the follower roll 12 to ride against the edge of the felt. As shown the arm 16 is pivotally supported on the frame 18 so that the weight of the arm and roll 12 will maintain the roll in engagement with the edge of the felt when the frame 18 is properly adjusted for the width of the felt to be measured. The arm extends upward above its pivot and its upper end may be provided with a stylus or a pencil 20 for recording on a chart placed on the frame 18 any lateral movements of the roll 12 and arm 16 due to variations in the width of the felt passing between the rolls 10 and 12. By providing the frame 18 or the chart applied thereto with a line or graduation indicating the position of the stylus 20 corresponding to the normal and proper width of the felt the maximum variation in the width below or above the normal may be indicated by the movement of the upper end of the arm 16 or the stylus on either side of the line and in case the stylus and chart are used the maximum variation in width of the felt below and above normal may be recorded on the chart and kept for future reference. The bar 8 should be so supported that the roll 10 which is fixed to the bar is maintained in engagement with the edge of the felt travelling over the supporting rolls 2 and 4 and for convenience the bar should also be supported for movement into and out of operative position with relation to the fabric. The bar may be conveniently thus supported by suspending it on supporting cords 22 which pass over guide pulleys 24 arranged above the drying roll 2. The cords are so arranged that the weight of the suspended bar tends to maintain the roll 10 in engagement with the edge of the felt and the ends of the cords are brought into convenient reach of the operator so that he may raise or lower the bar at will.

While it is preferred to employ the specific construction and arrangement of parts shown and described in applying the invention to a felt drying machine of the type indicated it will be understood that this construction and arrangement is not essential to the broader features of the invention and may be varied or modified as found desirable or best suited to the construction and arrangement of parts of the machine to which the invention is to be applied. It will also be understood that certain features of the invention may be utilized in measuring the width or variations in the width of endless webs other than paper machine felts if found desirable.

What is claimed is:

1. In a felt drying machine the combination with drying and stretching rolls, of two relatively movable edge engaging members, means for mounting them to ride against the opposite edges of the felt travelling over the rolls, and means associated with said members for recording variations in the width of the felt travelling between them.

2. In a felt drying machine the combination with the drying and stretching rolls of means for measuring the width of the felt passing over the rolls, and means for mounting the measuring means for movement into and out of operative relation to the felt.

3. In a felt drying machine the combination with the drying and stretching rolls of a bar having an edge engaging member fixed thereon and an opposed edge engaging member mounted thereon for movement toward and from the first member to accommodate itself to variations in the width of the felt passing between the members, and means for mounting the bar to maintain the fixed edge engaging member in engagement with one edge of the felt traveling over the rolls.

4. In a felt drying machine the combination with drying and stretching rolls of a bar having an edge engaging member fixed thereto, a frame mounted for movement lengthwise of the bar, and an edge engaging member mounted on the frame for movement toward and from the fixed member to accommodate itself to variations in the width of the felt passing between the members.

5. In a felt drying machine the combination with drying and stretching rolls of a bar provided with a fixed edge engaging member and with an opposed edge engaging member mounted on the bar for movement toward and from the fixed member to accommodate itself to variations in the width of the felt passing between the members, and means for supporting the bar to maintain the fixed edge engaging member in engagement with the edge of the travelling felt.

6. In a felt drying machine the combination with drying and stretching rolls of a bar provided with a fixed edge engaging member and an opposed edge engaging member mounted on the bar for movement toward and from the fixed member to accommodate itself to variations in the width of the felt passing between the member, and means for recording the movements of the movable member.

7. Mechanism for measuring the width of webs having, in combination, supporting rolls over which the web passes, means for measuring variations in the width of the web comprising two relatively movable edge engaging members, and means for mounting them to ride against the opposite edges of the web travelling over the rolls.

8. Mechanism for measuring the width of webs having, in combination, supporting rolls over which the web travels, two relatively movable edge engaging members, means for mounting the members to ride against opposite edges of the web travelling over the rolls, and means associated with said members for indicating the width and variations in the width of the web travelling between them.

9. Mechanism for measuring the width of webs having, in combination, a bar provided with a fixed edge engaging member, means for mounting the bar for movement to maintain the member in engagement with one edge of the travelling web, and an opposed edge engaging member mounted for movement on the bar to accommodate itself to variations in the width of the web passing between the members.

10. Mechanism for measuring the width of webs having, in combination, supporting rolls over which the web passes, a bar provided at one end with a fixed edge engaging member, means for mounting the bar to maintain said member in engagement with one edge of the traveling web, a frame mounted to slide on the other end of the bar, an edge engaging member mounted for movement on the frame toward and from the fixed member to accommodate itself to variations in the width of the travelling web passing between the members.

11. Mechanism for measuring the width of webs having, in combination, supporting rolls over which the web passes, a bar, an edge engaging member fixed on one end of the bar, means for mounting the bar to maintain said edge engaging member in engagement with one edge of the traveling web, a frame mounted to slide on the other end of the bar, an arm pivoted on the frame, and an edge engaging member carried on the arm.

12. Mechanism for measuring the width of webs having, in combination, a bar, an edge engaging member fixed on one end of the bar, a frame mounted to slide on the other end of the bar, an arm pivoted on the frame and provided on its lower end with an edge engaging member, a stylus on the arm for recording its movements on a chart applied to the frame, and means for supporting the bar to maintain the fixed member in engagement with the edge of a web travelling between the edge engaging members.

EZEKIEL J. WILSON.